United States Patent
Song et al.

(10) Patent No.: US 7,542,246 B1
(45) Date of Patent: Jun. 2, 2009

(54) TRANSDUCER WITH POLE TIP PROTRUSION COMPENSATION LAYER

(75) Inventors: Suping Song, Fremont, CA (US); Kroum S. Stoev, Pleasanton, CA (US); Biao Sun, Fremont, CA (US); He Li, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 378 days.

(21) Appl. No.: 11/406,094

(22) Filed: Apr. 18, 2006

(51) Int. Cl.
*G11B 5/39* (2006.01)
*G11B 5/187* (2006.01)

(52) U.S. Cl. ............... 360/319; 360/294.7; 360/125.71; 360/125.74

(58) Field of Classification Search ............ 360/123.37, 360/123.58, 125.71, 125.74, 125.75, 317, 360/319, 294.7, 251.74
See application file for complete search history.

(56) References Cited

U.S. PATENT DOCUMENTS 7,102,853 B2 * 9/2006 Macken et al. ......... 360/123.25

| | | | |
|---|---|---|---|
| 2003/0099054 A1 * | 5/2003 | Kamijima | 360/59 |
| 2003/0235014 A1 * | 12/2003 | Yamanaka et al. | 360/317 |
| 2004/0188859 A1 * | 9/2004 | He | 257/783 |
| 2007/0188919 A1 * | 8/2007 | Kobayashi | 360/126 |

OTHER PUBLICATIONS

Balch, et al, Copper-Zirconium Tungstate Composites Exhibiting Low and Negative Thermal Expansion Influenced by Reinforcement Phase Transformations, Metallurgical and Materials Transactions, Mar. 15, 2004;,35, 3A, Research Library p. 1159.

* cited by examiner

*Primary Examiner*—Jefferson Evans
(74) *Attorney, Agent, or Firm*—Barcelo & Harrison LLP

(57) ABSTRACT

A transducer for a disk drive head includes a pole tip protrusion (PTP) compensation layer disposed proximate to a write element of the head to at least partially offset the effect of pole tip protrusion. The PTP compensation layer can be above, below, or within the write element. Suitable materials for the PTP compensation layer include zirconium oxide ceramics characterized by negative coefficients of thermal expansion such as $ZrMo_2O_8$.

17 Claims, 10 Drawing Sheets

TRANSDUCER WITH POLE TIP PROTRUSION COMPENSATION LAYER

BACKGROUND OF THE INVENTION

1. Field of the Invention

The present invention relates generally to the field of disk drives and more particularly to transducers for heads thereof, the transducers including a pole tip protrusion (PTP) compensation layer to counteract the effect of pole tip protrusion.

2. Description of the Prior Art

Magnetic disk drives store and retrieve data for digital electronic apparatuses such as computers. A typical disk drive, as in FIGS. 1 and 2, comprises a head 100, including a slider 200 and a transducer 210, in very close proximity to a surface of a rotatable disk 110. As shown in a cross-sectional view of FIG. 3, the transducer 210, in turn, includes a write element 300 and optionally a read element 310. As the disk 110 rotates beneath the head 100, a very thin air bearing is formed between the surface of the disk 110 and an air bearing surface (ABS) of the slider 200. The air bearing causes the head 100 to "fly" above the surface of the disk 110. As the head 100 flies over the disk 110, the write element 300 and the read element 310 can be alternately employed to write and read data bits along data tracks on the disk 110.

In FIG. 3, the metallic components are shown with cross-hatching, while the dielectric components are shown as solid. In the write element 300, a coil 315 is wound around a yoke 330 transverse to the plane of the drawing. An electric current in the coil 315 induces a magnetic field in the yoke 330 that fringes outward around a write gap 340 to interact with the surface of the disk 110 in order to write bits to the tracks of the disk 110. It has been found that the heating the write element 300, for example by the process of writing, creates differential thermal expansion between the metallic components and the dielectric components that distorts the write element 300 and warps a terminus surface 320 of the transducer 210. The terminus surface 320 of the transducer 210 tends to be parallel with, and slightly recessed from, the ABS of the slider 200.

The effect of warping the terminus surface 320 is commonly referred to as pole tip protrusion (PTP) because the effect is most pronounced at a pole tip 350 of the write element 300. More specifically, the pole tip 350 protrudes towards the surface of the disk 110, effectively reducing the spacing between the write element 300 and the disk 110 (the "flying height"). The heating that leads to pole tip protrusion has a number of sources. When pole tip protrusion is caused by writing it is sometimes referred to as write-induced pole tip protrusion (WPTP), while pole tip protrusion caused by thermal changes (e.g., moving the drive into a warmer environment) is sometimes referred to as thermal pole tip protrusion (TPTP).

The flying height of the head 100 is a critical factor affecting the density of the data that can be stored on the disk 110. Accordingly, the magnetic recording industry has strived to increase the data storage density in both longitudinal and perpendicular recording technologies by employing various techniques aimed at decreasing the average flying height. One technique has been to employ write-induced pole tip protrusion.

Another technique for reducing the flying height of the head 100 is to incorporate a heating element into the slider 200 to temporarily heat a portion of the head 100 to cause the transducer elements 300, 310 to move closer to the disk, thereby controllably reducing the flying height during periods of reading and writing. This allows the flying height to be lower during reading and writing to enable higher data densities, and higher otherwise to enhance the durability of the head-disk interface. The technique of controllably reducing flying height when reading and writing is commonly known as dynamic flying height actuation.

Still referring to FIG. 3, heating elements 360, 370, and 380 are disposed in various locations within the write element 300. It will be appreciated that these elements may be operated in parallel or in series, may be fewer or greater in number, and placed at other locations in the transducer 210 than those shown. Examples of dynamic flying height heaters are provided in patent application Ser. No. 11/112,112, filed Apr. 22, 2005 and entitled "PERPENDICULAR MAGNETIC RECORDING HEAD WITH DYNAMIC FLYING HEIGHT HEATING ELEMENT."

FIG. 4 models the effect of pole tip protrusion due to different heating sources. In FIG. 4 line 400 represents the terminus surface 320 as viewed in cross-section in the vicinity of the write gap 330 in the absence of any pole tip protrusion. Axis 410 is centered on the write gap 330. Line 420 represents the terminus surface 320 with the effect of thermal pole tip protrusion, line 430 shows the effect of write-induced pole tip protrusion, and line 440 shows the effect of pole tip protrusion induced by a dynamic flying height heater. To model thermal pole tip protrusion, the ambient temperature was set to 65° C. To model write-induced pole tip protrusion, an AC current was set to 35 mA with a frequency of 250 mHz. To model pole tip protrusion caused by a dynamic flying height heater, a model was built on a NiCr heater with a resistance of 60 ohm and operated at 150 mW.

A problem with dynamically reducing the flying height by causing the terminus surface 320 to bulge towards the disk 110 is that the point on the transducer 210 that is closest to the disk 110 is a point 390 because of the angled flight orientation of the head 100 as seen in FIG. 2. It has been found that pole tip protrusion also moves the point 390 even closer to the surface of the disk 110 than the write element 300. Thus, the point 390 strikes more asperities on the disk 110 and the probability of a catastrophic head crash increases.

SUMMARY

An exemplary transducer for a head comprises a write element and a pole tip protrusion (PTP) compensation layer disposed proximate to the write element. The PTP compensation layer is configured to contract as a function of increasing temperature to compensate for pole tip protrusion. In some embodiments the PTP compensation layer comprises a material having a negative coefficient of thermal expansion such as a zirconium oxide ceramic. Suitable examples of such ceramics include $ZrMo_2O_8$, $ZrW_2O_8$, $Y_2W_3O_{12}$, and $ZrW_xMo_{2-x}O_8$.

In some embodiments of the present invention the transducer comprises an overcoat layer of a dielectric material disposed over the write element. In some of these embodiments the PTP compensation layer is disposed within the overcoat layer. In other embodiments the transducer includes a shield below the write element and the PTP compensation layer is disposed within the shield. In still other embodiments the transducer includes an undercoat layer below the write element and the PTP compensation layer is disposed within the undercoat layer. Additionally, in some embodiments the write element further includes a dynamic flying height heater.

DETAILED DESCRIPTION OF THE INVENTION

Figure 5:
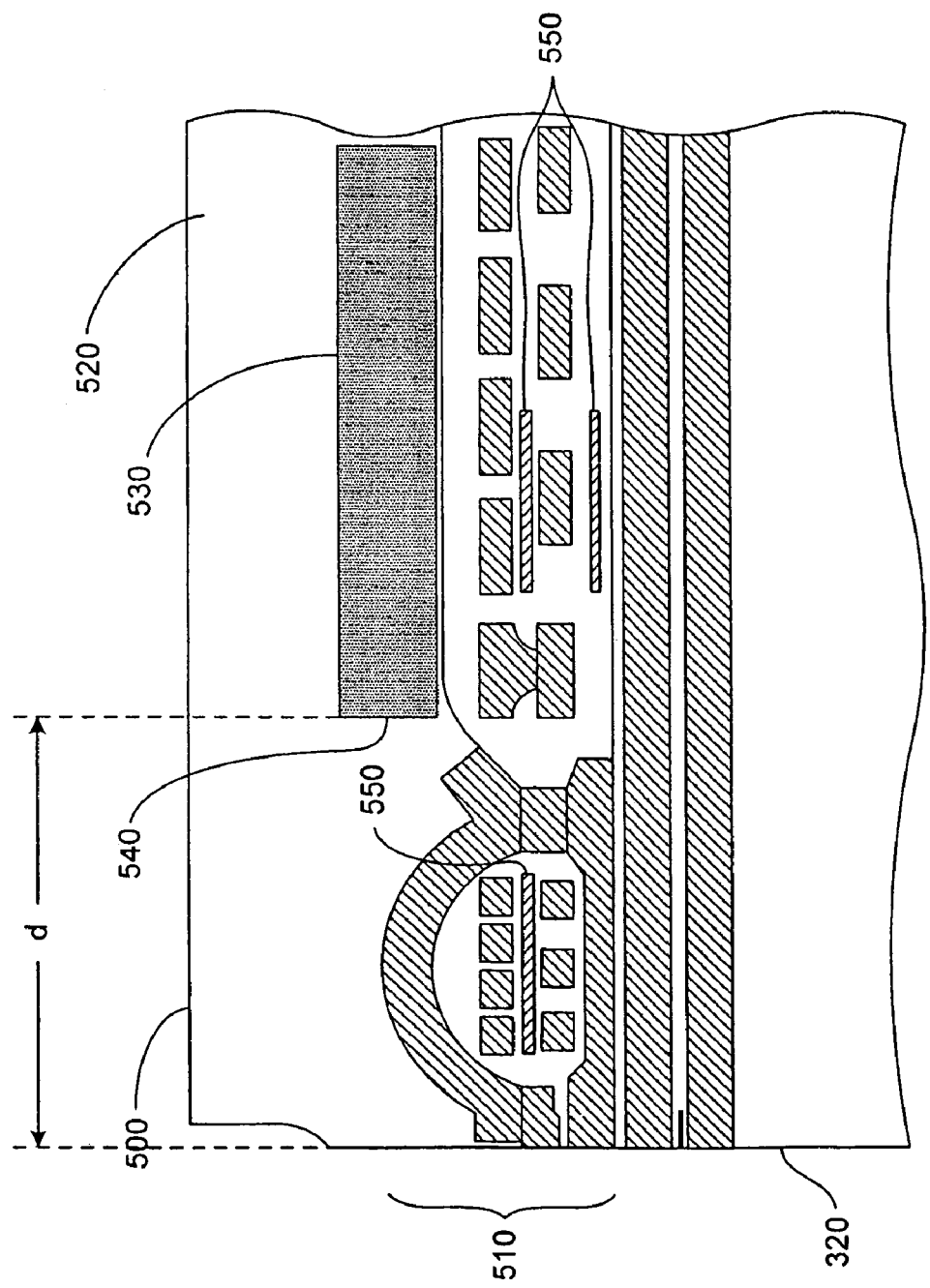
FIG. 5 shows a cross-sectional view of a transducer according to an exemplary embodiment of the present invention.

FIG. 5 illustrates an exemplary transducer 500 according to an embodiment of the present invention. The transducer 500 comprises a write element 510, an overcoat layer 520 disposed over the write element 510, and a PTP compensation layer 530 disposed within the overcoat layer 520. The overcoat layer 520 is a dielectric material. In some embodiments, the overcoat layer 520 comprises alumina. The function of the PTP compensation layer 530 is to at least partially counteract the effect of pole tip protrusion, such as by contracting while surrounding materials are expanding in response to heating. In some embodiments, a front face 540 of the PTP compensation layer 530 is recessed by a distance, d, from the terminus surface where the distance is in the range of about 1 to about 60 μm.

In some embodiments, the transducer 500 also comprises a dynamic flying height heater 550. The dynamic flying height heater 550 can have one or more heater elements that can be configured to operate either in parallel or in series. While FIG. 5 shows three heater elements, fewer or greater elements can be employed and the heater elements can be placed at locations in the transducer 500 other than those shown.

One way for the PTP compensation layer 530 to counteract the effect of pole tip protrusion is to have the PTP compensation layer 530 include a material having a negative coefficient of thermal expansion. A material with a negative coefficient of thermal expansion will contract as it gets warmer. This is in contrast to the normal material behavior which is characterized by a positive coefficient of thermal expansion and expansion with increasing temperature.

It will be appreciated that pole tip protrusion can also be counteracted with a PTP compensation layer 530 that contracts in response some other influence other than temperature. For instance, piezoelectric materials can expand or contract in response to an applied voltage. Using a piezoelectric material for the PTP compensation layer 530 may require electrical leads to the PTP compensation layer 530 and dedicated control circuitry (both not shown), and such embodiments may also require a separate control current, or alternatively, may be based on the dynamic flying height control current. While more complex, a piezoelectric PTP compensation layer 530 offers greater control. On the other hand, a PTP compensation layer 530 that employs a material with a negative coefficient of thermal expansion may be implemented to respond passively to temperature changes in a manner proportional to the expansion of other components, and therefore may be simpler to implement. Such a PTP compensation layer 530 also does not impose the need for further bonding pads on a head that includes the transducer 500.

Suitable materials with a negative coefficient of thermal expansion for the PTP compensation layer 530 include certain zirconium oxide ceramics. Examples of suitable zirconium oxide ceramics include $ZrW_2O_8$, $ZrMo_2O_8$, $HfW_2O_8$, $Y_2W_3O_{12}$, and $ZrW_wMo_{2-x}O_8$. Mixtures of these materials, and composites that employ these materials (e.g., metal matrix composites) can also be used. Ceramic composites of these materials with other ceramic materials such as alumina will also work. The properties of $ZrW_2O_8$ are particularly well suited to the present application because the coefficient of thermal expansion is isotropic and large over a wide range of temperatures. More specifically, the average coefficient of thermal expansion over the temperature range of –273° C. to 777° C. is about $-8 \times 10^{-6} K^{-1}$.

Figure 6:
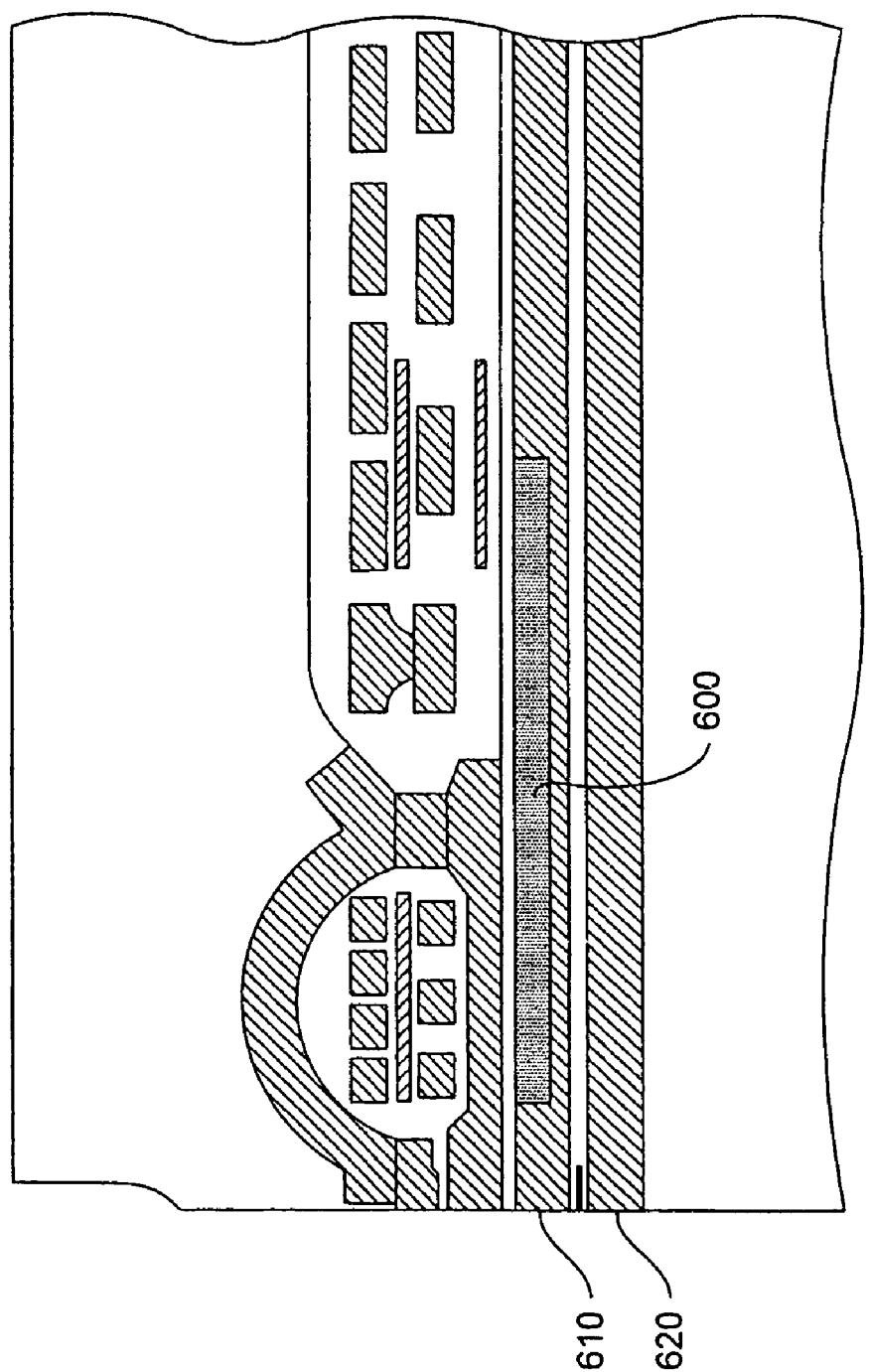
FIG. 6 shows a cross-sectional view of a transducer according to another exemplary embodiment of the present invention.
Figure 7:
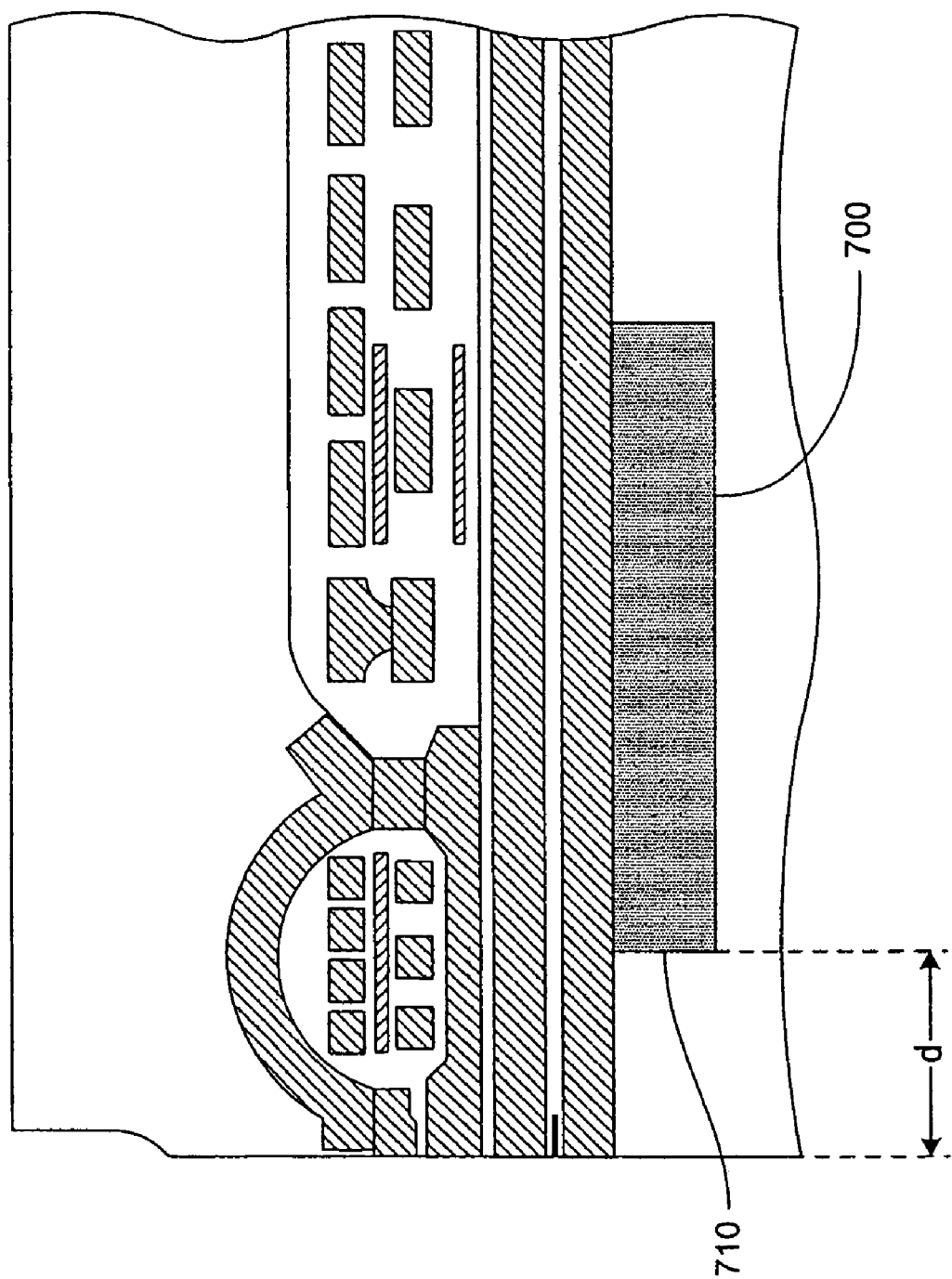
FIG. 7 shows a cross-sectional view of a transducer according to yet another exemplary embodiment of the present invention.

A PTP compensation layer can also be located in other locations in the transducer 500 other than in the overcoat layer 520. For example, as shown in FIG. 6, a PTP compensation layer 600 can be disposed within either shield 610 or 620. As shown in FIG. 7, a PTP compensation layer 700 can also be disposed within an undercoat layer 710. In some embodiments, a front face 710 of the PTP compensation layer 700 is recessed by a distance, d, from the terminus surface where the distance is in the range of about 1 to about 20 μm. A transducer 500 can also employ more than one PTP compensation layer, and different PTP compensation layers can comprise different negative coefficient of thermal expansion materials or different dimensions, and various implementations of PTP compensation layers may have different amounts of recession from the terminus surface.

Figure 4:
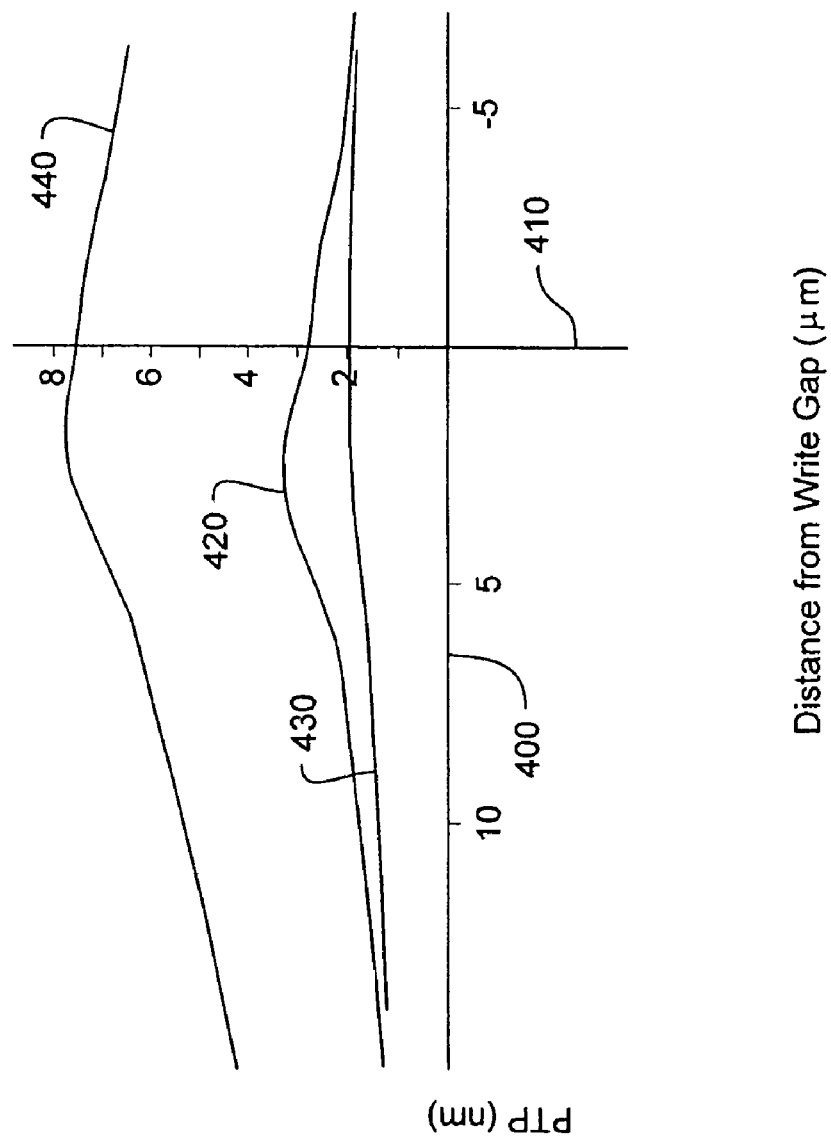
FIG. 4 shows modeled data for pole tip protrusion according to the prior art.
Figure 8:
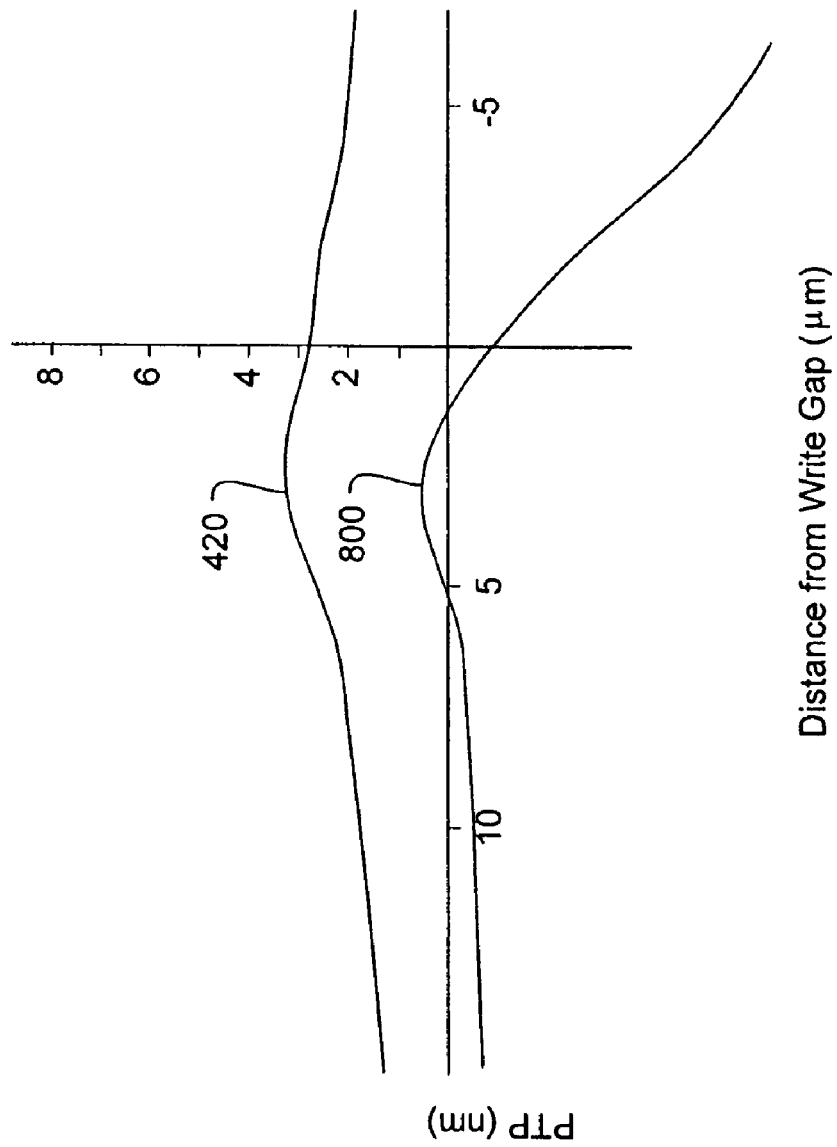
FIGS. 8-10 show modeled data for pole tip protrusion according to embodiments of the present invention as compared to the prior art.
Figure 9:
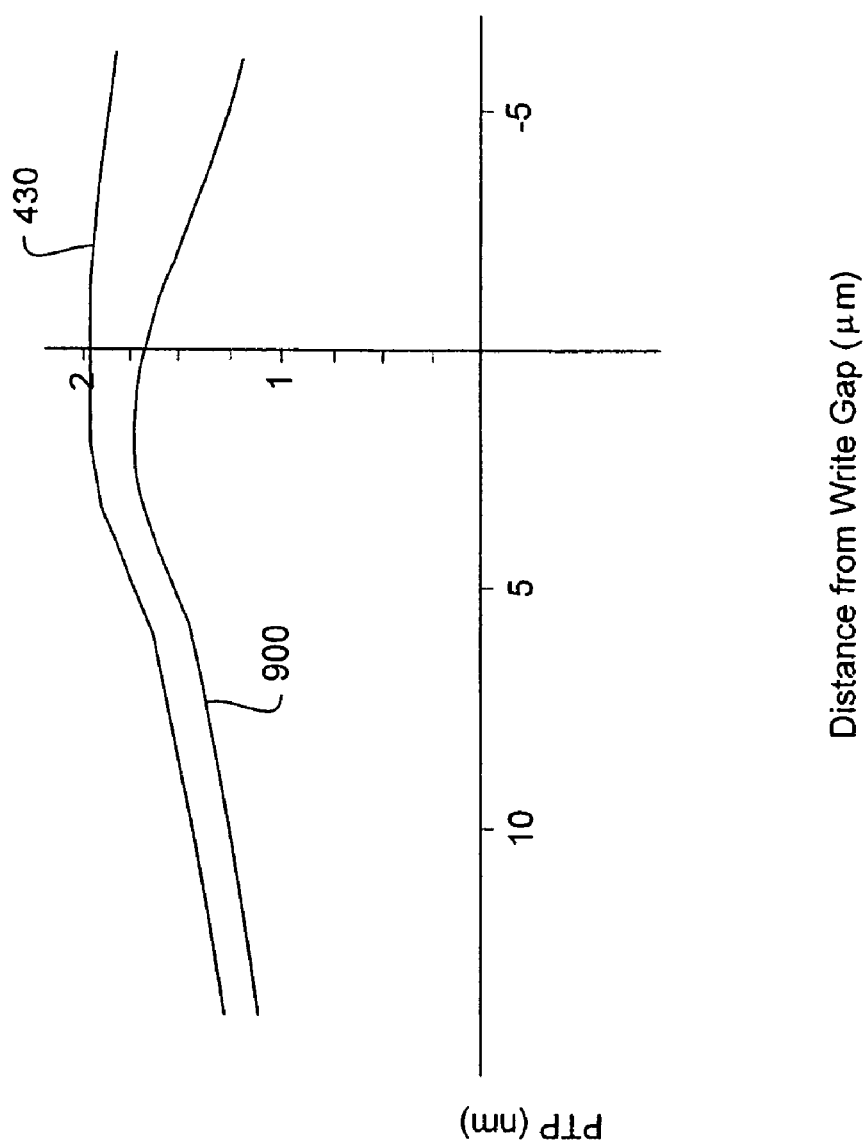
Figure 10:
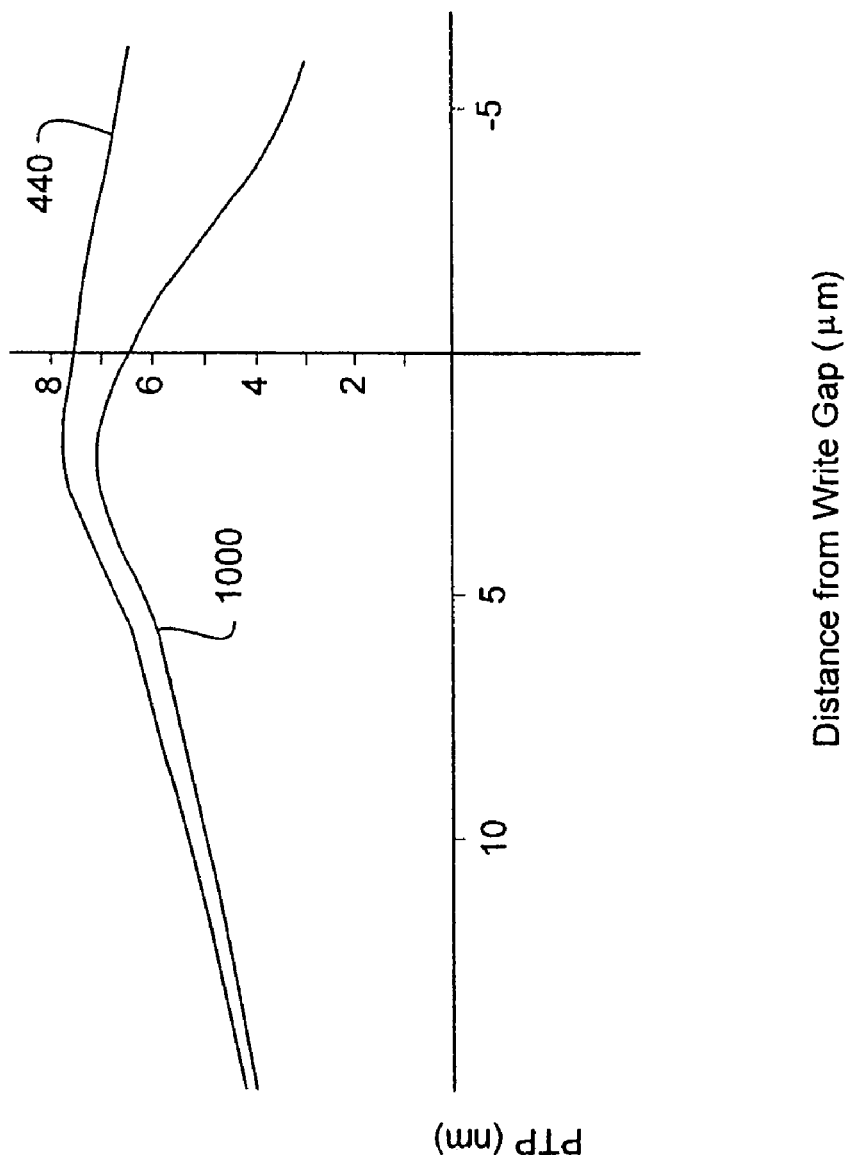

FIGS. 8-10 illustrate differences in pole tip protrusion introduced by a PTP compensation layer. FIG. 8 shows a comparison between line 420 (FIG. 4) for the case of thermal pole tip protrusion and a line 800 resulting from the introduction of the PTP compensation layer 530 to the model. FIG. 9 shows a comparison between line 430 (FIG. 4) for the case of write-induced pole tip protrusion and a line 900 resulting from the introduction of the PTP compensation layer 530 to the model. Note that in FIG. 9 the vertical scale has been expanded as compared to FIG. 4. FIG. 10 shows a comparison between line 440 (FIG. 4) for the case of pole tip protrusion due to dynamic flying height heating and a line 1000 resulting from the introduction of the PTP compensation layer 530 to the model.

Figure 1:
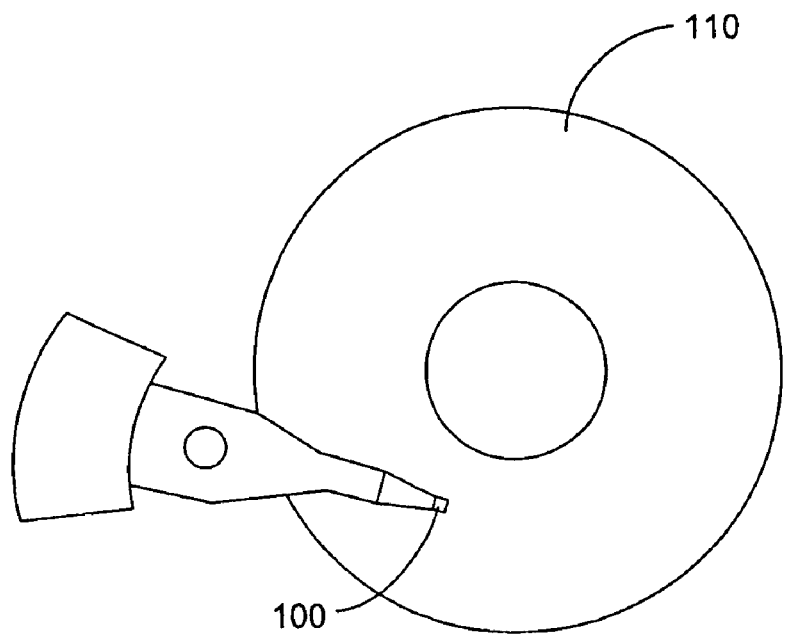
FIGS. 1 and 2 show top and side views, respectively, of a head and disk of a disk drive according to the prior art.
Figure 2:
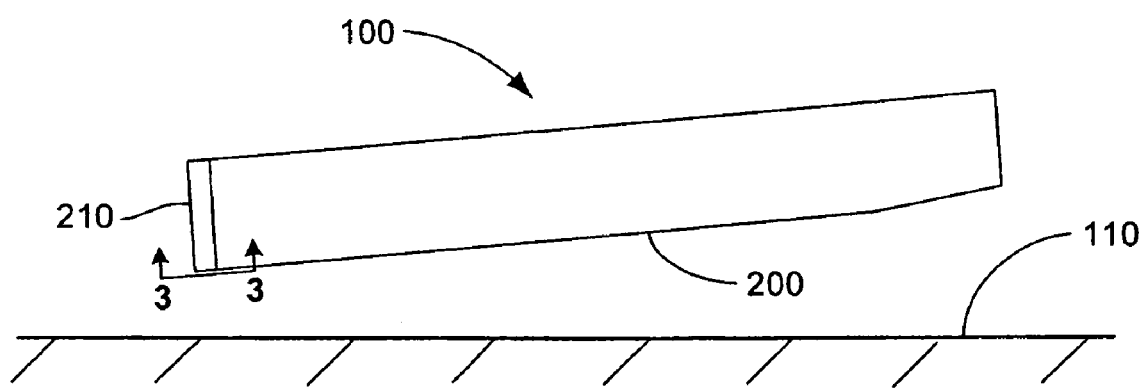
Figure 3:
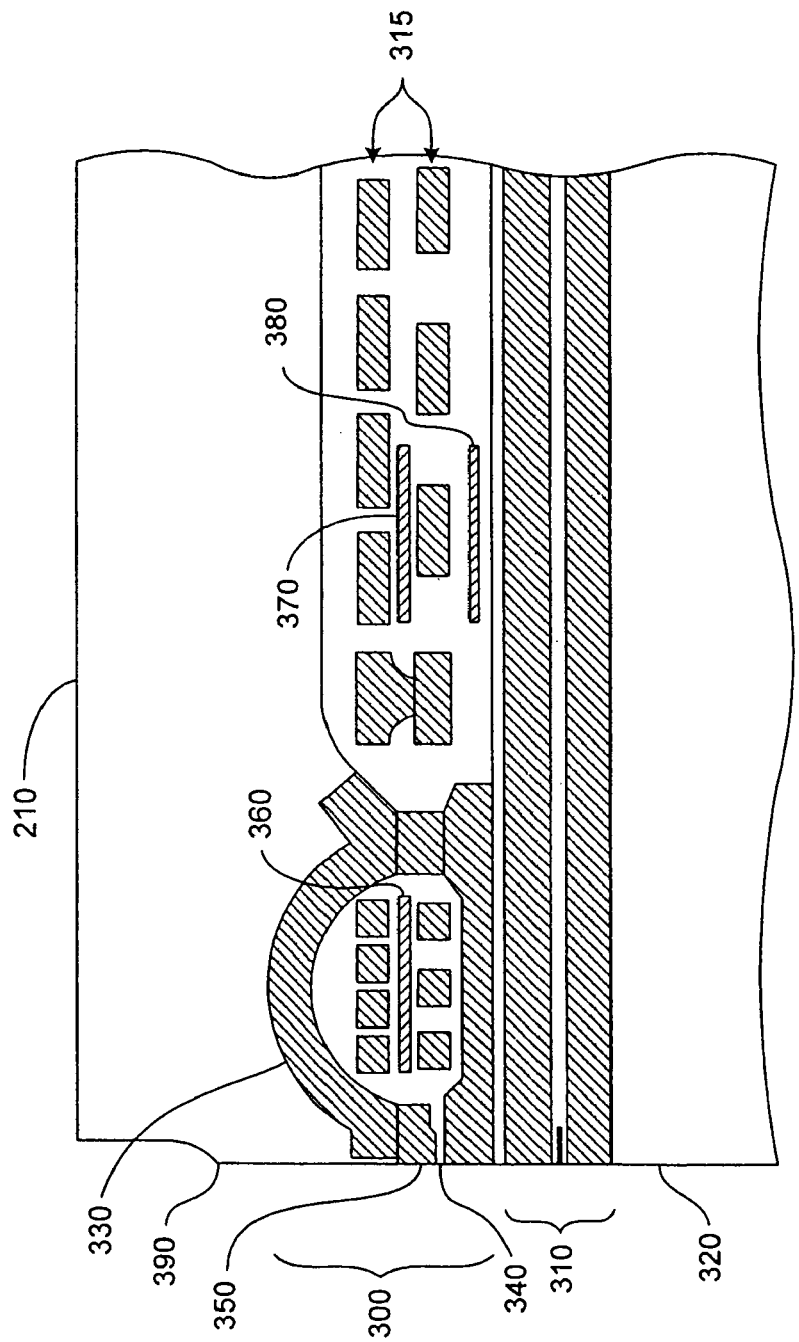
FIG. 3 shows a cross-sectional view of a transducer according to the prior art.

It can be seen from FIGS. 8-10 that the use of the PTP compensation layer 530 serves to reduce the pole tip protrusion due to all three heating sources. In the case of pole tip protrusion due to dynamic flying height heating (FIG. 10), the reduction in protrusion measured at the pole tip itself is on the order of 1 nm, a small proportion of the deliberately induced protrusion. However, the reduction in protrusion is over 3 nm towards point 390 (FIG. 3). Thus, the PTP compensation layer 530 tends to draw point 390 away from the surface of the disk without significantly decreasing the dynamic flying height adjustment at the location of the pole tip.

Figure 11:
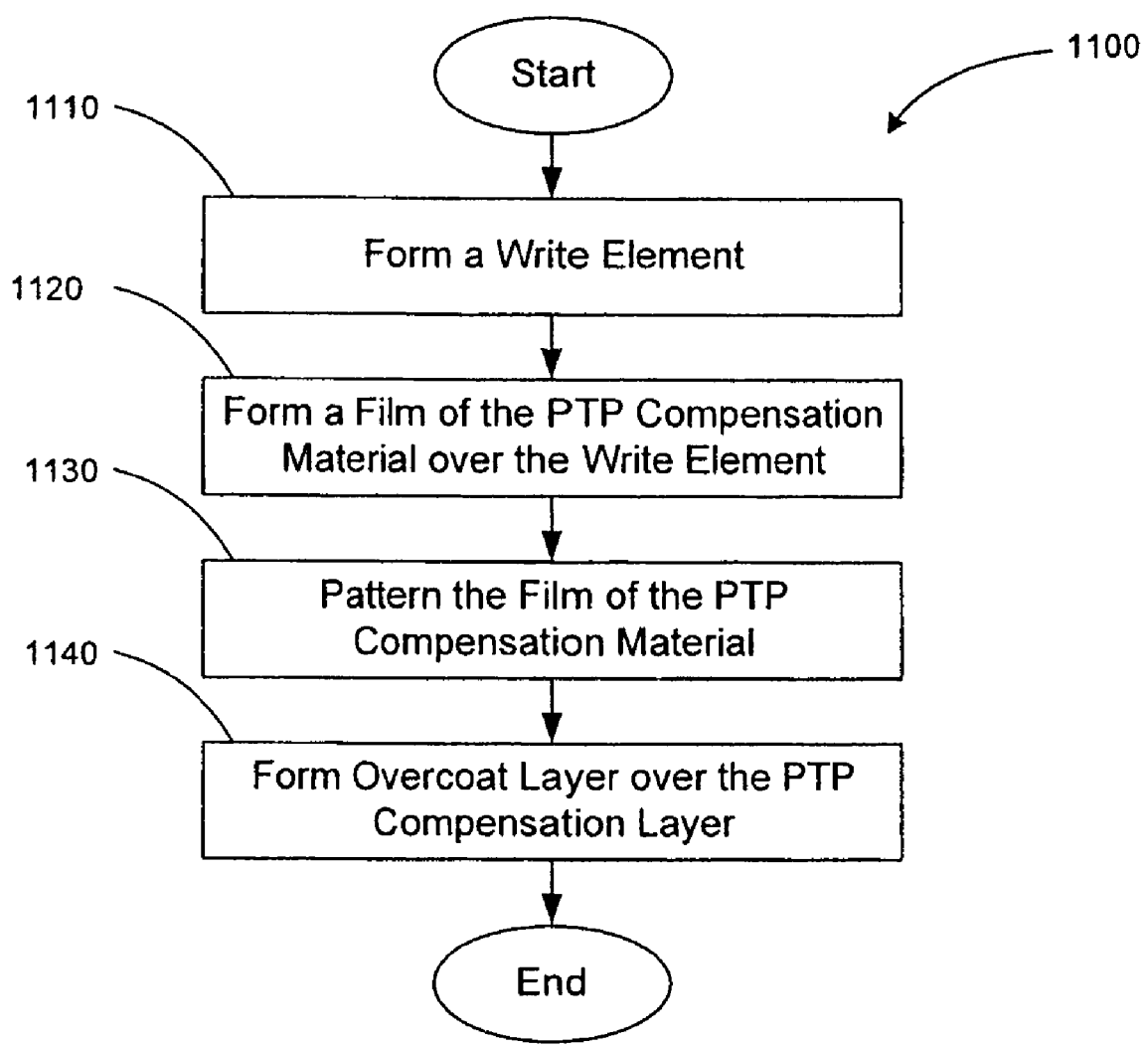
FIG. 11 is a flowchart representation of a method of fabricating a PTP compensation layer according to an exemplary embodiment of the present invention.

FIG. 11 schematically illustrates an exemplary method 1100 for making a transducer that includes a PTP compensation layer. The method comprises a step 1110 of forming a write element, a step 1120 of forming a film of the PTP compensation material over the write element, a step 1130 of patterning the film, and a step 1140 of forming an overcoat layer over the PTP compensation layer.

In step 1110 a write element is formed. The write element is formed, in some embodiments, to include a dynamic flying height heater. In some embodiments, such as those illustrated in FIGS. 5-7, the topmost layer of the yoke 330 (FIG. 3) is a P3 layer and is formed by plating over a seed layer. Thus, step 1110 includes, in some embodiments, forming a P3 layer over a seed layer.

In step 1120 the film of the PTP compensation material is formed over the write element. The film of the PTP compensation material can be formed, for example, by radio frequency (RF) sputtering or by laser ablation of a target composed of the desired material, such as $ZrW_2O_8$. The film of the PTP compensation material can also be formed, for instance, by molecular beam epitaxy (MBE) starting with appropriate precursor materials.

In step 1130 the film of the PTP compensation material is patterned to form the PTP compensation layer. The patterning can be achieved, for example, by conventional photolithography techniques including forming a mask over a portion of the film to be preserved, etching unmasked portions of the film, and removing the mask. In those embodiments in which a seed layer is used to form a P3 layer, step 1130 can also comprise milling the seed layer after removing the mask.

In step 1140 the overcoat layer is formed over the PTP compensation layer. The overcoat layer is a dielectric material and can be formed from alumina, as one example. One method for forming the overcoat layer includes RF sputtering.

It will be appreciated that the method 1100 can be readily adapted to placing the PTP compensation layer at other locations within the transducer. For example, to form the PTP compensation layer within a shield (FIG. 6), a portion of the shield layer can be milled to form a recess therein. Next, the film of the PTP compensation material can be deposited over the shield to fill the recess. A planarization step, such as by chemical mechanical polishing (CMP) can be employed to remove any portion of the film outside of the recess. Then, the write element may be completed in the conventional manner.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," and all variants and forms thereof used herein, are specifically intended to be read as open-ended terms of art.

We claim:

1. A transducer for a head, the transducer comprising:
   a write element;
   a read element including a shield below the write element; and
   a PTP compensation layer disposed within the shield;
   wherein the PTP compensation layer includes a material having a negative coefficient of thermal expansion.

2. The transducer of claim 1 wherein the PTP compensation layer includes a zirconium oxide ceramic.

3. The transducer of claim 1 wherein the PTP compensation layer includes $ZrW_2O_8$.

4. The transducer of claim 1 wherein the PTP compensation layer includes $ZrMo_2O_8$.

5. The transducer of claim 1 wherein the PTP compensation layer includes $Y_2W_3O_{12}$.

6. The transducer of claim 1 wherein the PTP compensation layer includes $ZrW_xMo_{2-x}O_8$.

7. A transducer for a head, the transducer comprising:
   a write element;
   a read element including a shield below the write element and
   a PTP compensation layer disposed within the shield and proximate to the write element and including a material having a negative coefficient of thermal expansion.

8. The transducer of claim 7 wherein the write element further includes a dynamic flying height heater.

9. A transducer for a head, the transducer comprising:
   a write element;
   a dynamic flying height heater; and
   a PTP compensation layer disposed within the overcoat layer;
   wherein the PTP compensation layer includes a material having a negative coefficient of thermal expansion.

10. The transducer of claim 9 wherein the PTP compensation layer includes a zirconium oxide ceramic.

11. The transducer of claim 9 wherein the PTP compensation layer includes $ZrW_2O_8$.

12. The transducer of claim 9 wherein the PTP compensation layer includes $ZrMo_2O_8$.

13. The transducer of claim 9 wherein the PTP compensation layer includes $Y_2W_3O_{12}$.

14. The transducer of claim 9 wherein the PTP compensation layer includes $ZrW_xMo_{2-x}O_8$.

15. A transducer for a head, the transducer comprising:
   a write element;
   a dynamic flying height heater; and
   a PTP compensation layer disposed proximate to the write element and including a material having a negative coefficient of thermal expansion.

16. The transducer of claim 15 further comprising an overcoat layer above the write element, the PTP compensation layer being disposed within the overcoat layer.

17. The transducer of claim 15 further comprising an undercoat layer below the write element, the PTP compensation layer being disposed within the undercoat layer.

* * * * *